United States Patent
Boutaghou et al.

(10) Patent No.: US 6,888,693 B2
(45) Date of Patent: May 3, 2005

(54) DISC DRIVE SLIDER WITH PROTRUDING ELECTROSTATIC ACTUATOR ELECTRODE

(75) Inventors: Zine-Eddine Boutaghou, Vadnais Heights, MN (US); Ram Mohan Rao, Shoreview, MN (US); Tim William Stoebe, Minnetonka, MN (US); John R. Pendray, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 233 days.

(21) Appl. No.: 10/368,705

(22) Filed: Feb. 18, 2003

(65) Prior Publication Data

US 2004/0051992 A1 Mar. 18, 2004

Related U.S. Application Data (60) Provisional application No. 60/410,492, filed on Sep. 13, 2002.

(51) Int. Cl.⁷ .............................................. G11B 21/02
(52) U.S. Cl. ................... 360/75; 360/234.4; 360/235.4; 360/294; 29/603.07
(58) Field of Search .............................. 360/75, 69, 31, 360/25, 230–237, 237.1, 234.4, 234.5, 245.8, 235.4, 294; 369/53.25; 310/309; 29/603.07, 603.09, 840, 846

(56) References Cited

U.S. PATENT DOCUMENTS

| | | | |
|---|---|---|---|
| 4,605,977 A | 8/1986 | Matthews ..................... 360/103 |
| 4,823,205 A | 4/1989 | Hannon et al. ................. 369/14 |
| 4,931,887 A | 6/1990 | Hegde et al. .................. 360/75 |
| 5,276,573 A * | 1/1994 | Harada et al. ............. 360/235.3 |
| 5,523,639 A * | 6/1996 | Okamoto et al. ............ 310/309 |
| 5,764,432 A | 6/1998 | Kasahara ....................... 360/75 |
| 5,920,978 A | 7/1999 | Koshikawa et al. ...... 29/603.12 |
| 5,991,118 A * | 11/1999 | Kasamatsu et al. ....... 360/236.6 |
| 6,005,736 A | 12/1999 | Schreck ......................... 360/75 |
| 6,088,907 A | 7/2000 | Lee et al. ................. 29/603.03 |
| 6,269,687 B1 | 8/2001 | Zhang et al. .................. 73/105 |
| 6,359,746 B1 | 3/2002 | Kakekado et al. ............ 360/75 |
| 6,366,416 B1 | 4/2002 | Meyer et al. .................. 360/75 |
| 6,529,342 B1 | 3/2003 | Feng et al. .................... 360/75 |
| 6,700,724 B2 * | 3/2004 | Riddering et al. ............ 360/69 |
| 6,714,499 B2 * | 3/2004 | Katayama ................ 369/53.25 |
| 6,775,089 B1 * | 8/2004 | Bonin et al. ................... 360/75 |
| 2002/0030938 A1 | 3/2002 | Boutaghou et al. ....... 360/236.3 |
| 2002/0097517 A1 | 7/2002 | Bonin et al. ................... 360/75 |

FOREIGN PATENT DOCUMENTS

| | | |
|---|---|---|
| EP | 362 683 | 12/1988 |
| EP | 493 885 | 11/1991 |
| WO | WO 02/059880 | 8/2002 |
| WO | WO 03/019538 | 3/2003 |

\* cited by examiner

Primary Examiner—Andrew L. Sniezek
Assistant Examiner—Fred F. Tzeng
(74) Attorney, Agent, or Firm—Westman, Champlin & Keely (57) ABSTRACT

A device for accessing data stored on a medium includes a substrate that has a transducer on a back side, a bottom side facing the disc, and a surface that protrudes from the bottom side. An insulation layer is placed on top of the surface. An electrostatic actuator electrode is placed on top of the insulation layer. The electrostatic actuator electrode faces the medium across an electrostatically charged portion of an air layer. The electrostatic actuator electrode protrudes above the surface into the electrostatically charged portion of the air layer.

29 Claims, 8 Drawing Sheets

DISC DRIVE SLIDER WITH PROTRUDING ELECTROSTATIC ACTUATOR ELECTRODE

CROSS-REFERENCE TO RELATED APPLICATION

This application claims priority from U.S. Provisional Application 60/410,492 filed on Sep. 13, 2002 for inventors Zine Eddine Boutaghou, Ram Mohan Rao, Tim William Stoebe and John R. Pendray and entitled "Efficient method to achieve electrostatic fly height control."

FIELD OF THE INVENTION

The present invention relates generally to disc drives, and more particularly but not by limitation to sliders for disc drives.

BACKGROUND OF THE INVENTION

Increasing disc drive areal density has resulted in a drastic decrease in head media spacing (HMS). Spacing loss due to variation in fly height has become a significant contributor to the overall HMS losses. This HMS loss can lead to intermittent head/media contact, especially with current sub 15 nanometer fly heights. Intermittent contact may induce vibrations detrimental to the recording system quality and robustness.

Electrodes can be deposited in etched cavities on a slider and can be used to control fly height electrostatically. There are problems with high variations in the etched depth of the cavities that lead to high variations in the spacing between the electrode and the disc. The sensitivity (stroke) of these electrostatic actuators is unpredictable and production yields are low.

An electrostatic actuator for controlling fly height in a disc drive is needed that will avoid unpredictable actuator sensitivity, avoid low production yields and avoid the problems with variations in etched cavity depths.

Embodiments of the present invention provide solutions to these and other problems, and offer other advantages over the prior art.

SUMMARY OF THE INVENTION

A slider for accessing data stored on a disc and a method for manufacturing such a slider are disclosed. The slider includes a slider substrate that has a trailing side, a bottom side facing the disc, and an air bearing surface that protrudes from the bottom side. The slider also includes a read/write head on the trailing side. The read/write head accesses the data stored on the disc.

The slider includes an insulation layer disposed on top of the air bearing surface. An electrostatic actuator electrode is disposed on top of the insulation layer. The electrostatic actuator electrode faces the disc across an electrostatically charged portion of an air bearing layer. The electrostatic actuator electrode protrudes above the air bearing surface into the electrostatically charged portion of the air bearing layer.

Other features and benefits that characterize embodiments of the present invention will be apparent upon reading the following detailed description and review of the associated drawings.

DETAILED DESCRIPTION OF ILLUSTRATIVE EMBODIMENTS

Disclosed is a slider for a disc drive that includes a dedicated electrostatic actuator electrode that is insulated from a slider substrate. The electrostatic actuator electrode is positioned on top of an air bearing surface so that it protrudes into an electrostatically charged portion of an air bearing layer to control fly height. Statistical manufacturing variation problems associated with placing the electrode in an etched cavity are avoided by placing the electrostatic actuator electrode in an unetched or unmilled position rather than in an etched or milled cavity.

The electrostatic actuator electrode is positioned forward from a read/write head in a position where there is adequate clearance for the protrusion of the electrostatic actuator electrode. In preferred arrangements, multiple protruding electrostatic actuator electrodes are provided to provide additional control of roll or pitch of the slider.

Figure 2:
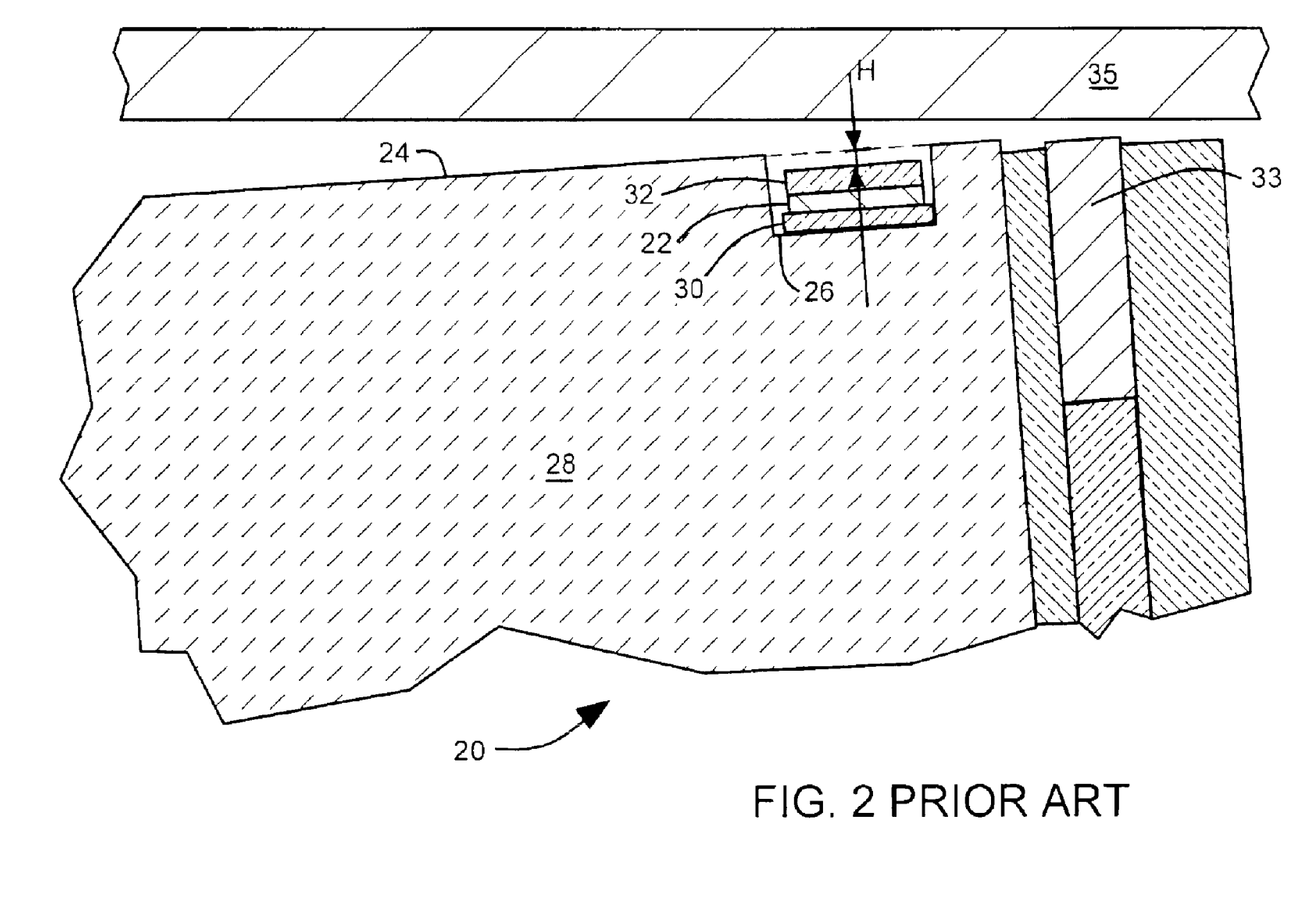
FIG. 2 illustrates a PRIOR ART slider with an electrode deposited below an air bearing surface in an etched cavity.

FIG. 2 illustrates a PRIOR ART slider 20 with an electrode 22 deposited below an air bearing surface 24 in an etched trench or cavity 26 in a slider substrate 28. The electrode 22 is insulated from the slider substrate 28 by an insulation layer 30. A layer of diamond-like carbon 32 is deposited over the electrode 22. The electrode 22 is placed in close proximity to a read/write head 33 to provide high sensitivity. In this "etch and deposition" method of FIG. 2, the electrode 22 is positioned close to the read/write head 33 to get adequate fly height stroke.

The cavity 26 is formed by an etch step and then the layers 30, 22 and 32 are deposited in the cavity 26. A difference in height H between the air bearing surface 24 and the top of the diamond-like carbon layer 32 depends on the deposition thicknesses of layers 30, 22, 32 and also on the etched depth of the cavity 26. There is a desire to have H=0 so that the electrode 22 is close to the disc or storage medium 35 to provide high sensitivity. The deposition thickness can be carefully controlled to have small statistical variance in production (low sigmas), however the depth of the cavity 26 can not be economically controlled and there is a large statistical variance in production (high sigma). Because of the high variance in the depth of cavity 26, there is a high variance in the height difference H.

With advanced air bearing sliders, the sensitivity (stroke) of the electrode 22 to the thickness of the air bearing layer is not adequately predictable from one unit to the next unit in production and production yields are low. One could try to design for the high etch depth sigma by additionally recessing the trench 26 by a certain multiple of the etch depth sigma. But doing this results in a loss in performance due to the increased spacing between the electrode 22 and the disc or storage medium 35.

The drawback of the arrangement shown in FIG. 2 are overcome by "deposition only" methods described below in connection with examples illustrated in FIGS. 1, 3–11.

Figure 1:
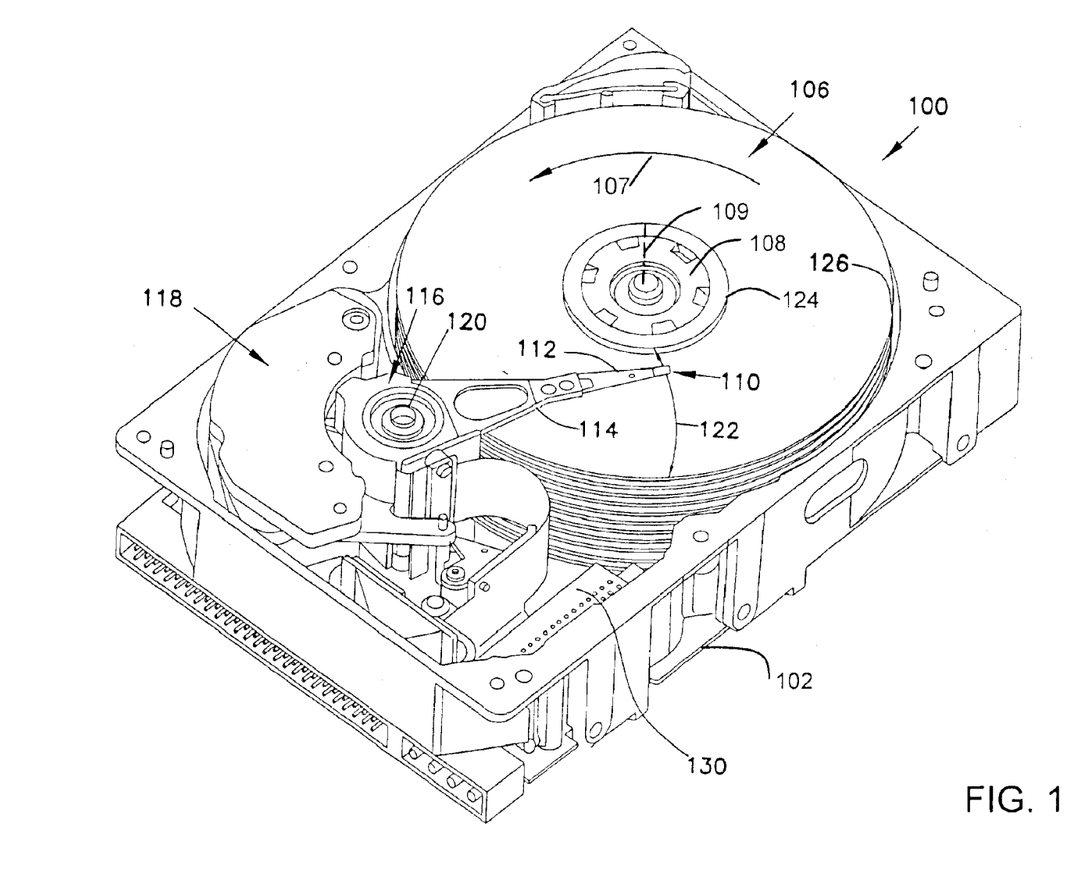
FIG. 1 is an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface, which comprises a data storage medium. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by servo electronics 130 based on signals generated by read/write heads 110 and a host computer (not shown). The disc read/write head slider 110 includes an electrostatic actuator electrode (not illustrated in FIG. 1) that adjusts fly height (FH) of the slider 110. Examples of sliders with electrostatic actuator electrodes are described below in connection with examples shown in FIGS. 3–11.

Figure 3:
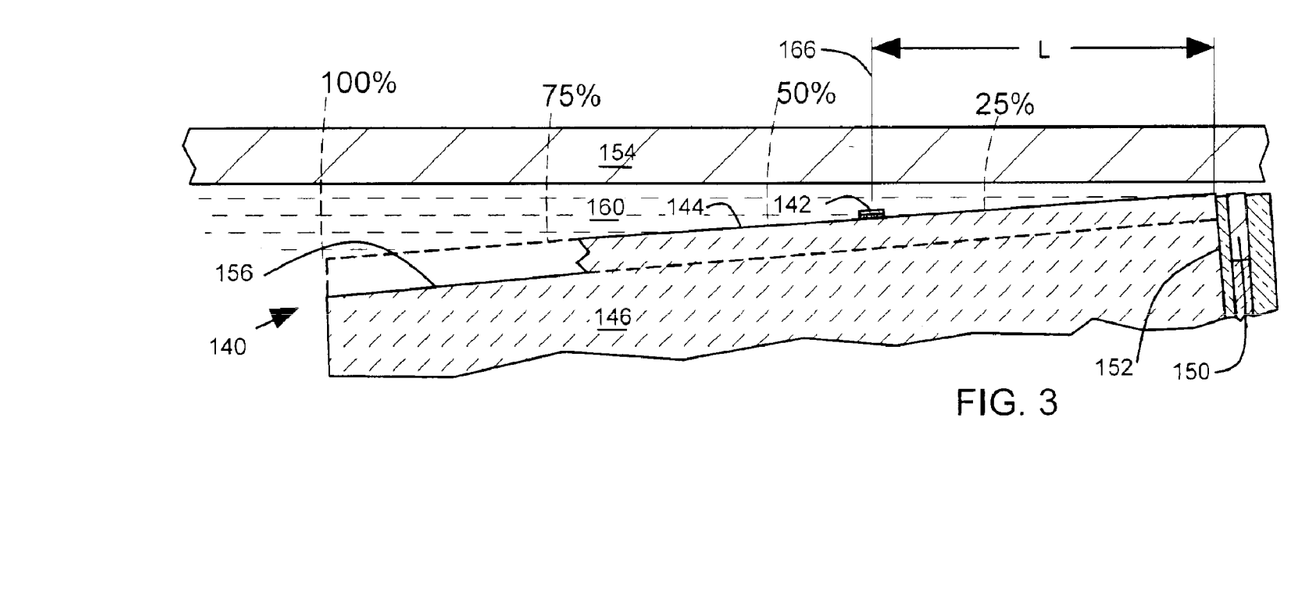
FIG. 3 illustrates a slider with an electrostatic actuator electrode disposed on top of an air bearing surface.
Figure 4:
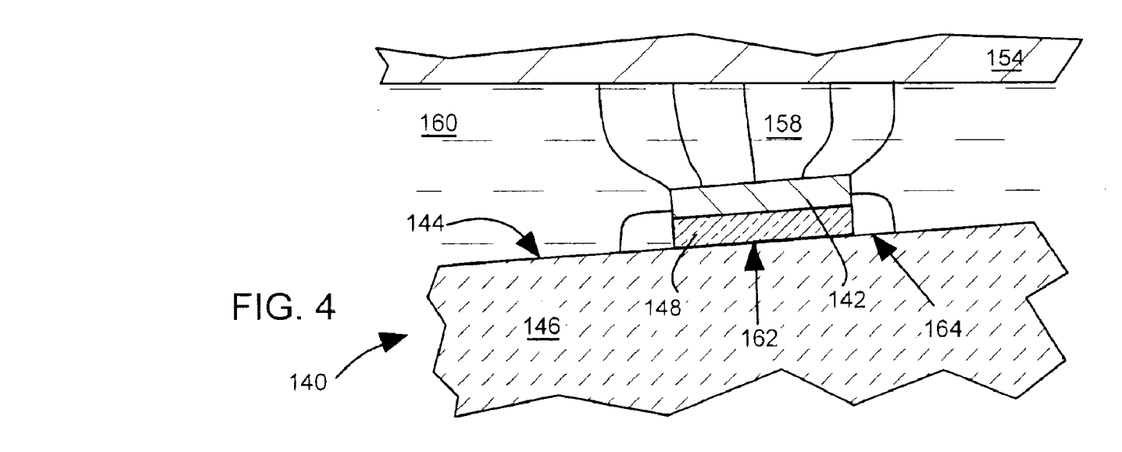
FIG. 4 illustrates an enlarged view of the electrostatic actuator electrode shown in FIG. 3.

FIG. 3 illustrates a slider 140 with an electrostatic actuator electrode 142 disposed on top of an air bearing surface 144. An enlarged view of the electrostatic actuator electrode 142 is shown in FIG. 4. Reference numbers used in FIG. 3 that are the same as reference numbers used in FIG. 4 identify the same features. The electrostatic actuator electrode 142 is electrically insulated from a slider substrate 146 by an insulation layer 148. The electrostatic actuator electrode 142 is referred to as a dedicated electrode and is electrically charged to control fly height without charging the slider substrate 146.

The slider 140 includes a read/write head (also called a transducer) 150 that is disposed on a trailing side 152 of the slider substrate 146. The read/write head 150 accesses data that is stored on a disc or storage medium 154. The slider substrate 146 has a bottom side 156 that faces the storage medium 154. The slider substrate 146 includes the air bearing surface 144 that protrudes from the bottom side 156. The slider substrate preferably comprises AlTiC which is not electrically insulating.

The insulation layer 148 is disposed on top of the air bearing surface 144. The insulation layer 148 is preferably comprised of alumina or silicon nitride. The electrostatic actuator electrode 142 is disposed on top of the insulation layer 148 and faces the disc 154 across an electrostatically charged portion 158 of an air bearing layer 160. The electrostatic actuator layer preferably comprises a thin metal film comprising tungsten, chromium or other metals. The electrostatic actuator electrode 142 protrudes above the unmilled air bearing surface 144 into the electrostatically charged portion 158 of the air bearing layer 160.

A portion 162 of the air bearing surface 144 that underlies the first insulation layer 148 is at substantially the same height as a portion of the air bearing surface 164 that is directly alongside the first insulation layer 148. The electrostatic actuator electrode 142 is positioned in an electrode position 166 that is forward from the trailing or back edge 152 by a length L sufficient to prevent contact between the first electrostatic actuator electrode 142 and the disc 154. The slider 140 flies at a slight pitch angle (flying attitude) to the disc 154, leaving a widening gap between the slider 140 and the disc 154 as the length L increases. Since there is no variation for etch depth, the elevation of the electrostatic actuator electrode 142 above the air bearing surface 144 can be carefully controlled. A length L can be selected that reliably provides the desired electrostatic actuator sensitivity without danger of the electrostatic actuator electrode 142 crashing into the disc 154. The use of etching and high variance in etch depth is avoided.

In a preferred arrangement, a layer of diamond-like carbon is deposited over the electrostatic actuator electrode 142 to preclude contact with the disc 154 even when the disc drive is de-energized. By strategically placing one or more dedicated electrostatic actuator electrodes 142 on the slider substrate 146, a higher or lower fly height can be selected. Electrical connections to the electrostatic actuator electrode 142 shown in FIGS. 3–4 can be made as described below in connection with an example illustrated in FIG. 5.

Figure 5:
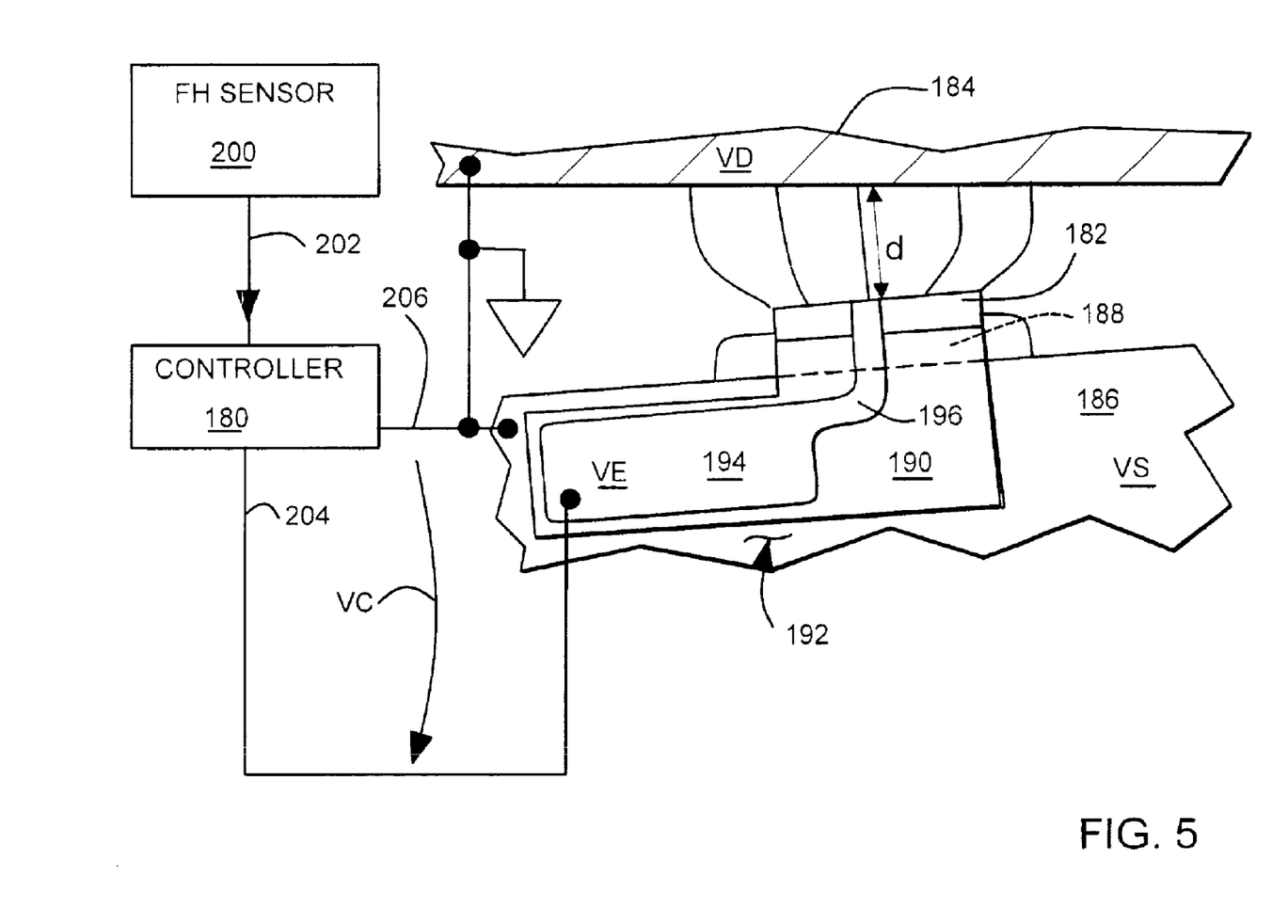
FIG. 5 illustrates electrical connections from a controller to an electrostatic actuator electrode, a disc and a slider substrate.

FIG. 5 illustrates electrical connections from a controller 180 to an electrostatic actuator electrode 182, a disc 184 and a slider substrate 186. The electrostatic actuator electrode 182 has an electrode potential VE, and the slider substrate has a slider substrate potential VS that is different than the electrode potential VE. An insulation layer 188 (hidden from view in FIG. 5) electrically insulates the electrostatic actuator electrode 182 from the slider substrate 186. The insulation layer 188 is preferably alumina or silicon nitride. The disc 184 has a disc potential VD that differs from the electrode potential VE by a control voltage VC. The slider substrate 186 is electrically connected to the disc 184 and the slider substrate potential VS is substantially equal to the disc potential VD.

A sidewall insulating layer 190 is disposed on a sidewall 192 of the slider substrate 186 and preferably extends over a side of the insulating layer 188. The sidewall 192 can be any one of the sides (leading, trailing, left, right) of the slider substrate 186. A bonding pad 194 is disposed on the sidewall insulating layer 190. The bonding pad preferably comprises aluminum. The bonding pad 194 connects to a source of the electrode potential VE such as controller 180. An electrode lead 196 electrically connects the bonding pad 194 to the electrostatic actuator electrode 182. The electrode lead 196 is preferably formed of the same material as the bonding pad 194.

Fly height is sensed by a fly height sensor 200. An output 202 from the fly height sensor couples to the controller 180. The fly height sensor 200 can be the read head itself, an optical sensor, a magnetic sensor, an electrostatic sensor or other known type of sensor. In some cases, the electrostatic actuator electrode 182 can also serve as an electrostatic fly height sensor. The controller 180 generates the control voltage VC between an output conductor 204 and a DC common conductor 206. The control voltage VC can be AC, DC or other waveforms with an adjustable amplitude. The output conductor 204 is connected to the electrostatic actuator electrode 182 by way of the bonding pad 194 and the electrode lead 196. The DC common conductor 206 connects to the slider substrate 186 and to the disc 184. Both the slider substrate 186 and the disc 184 are at the same electrostatic potential and there is no substantial electrostatic force generated between them.

The electrostatic actuator electrode 182 is electrostatically charged relative to the disc 184 and generates an electrostatic attractive force between the disc 184 and the electrode 182 as explained in an example described below in connection with FIG. 6.

Figure 6:
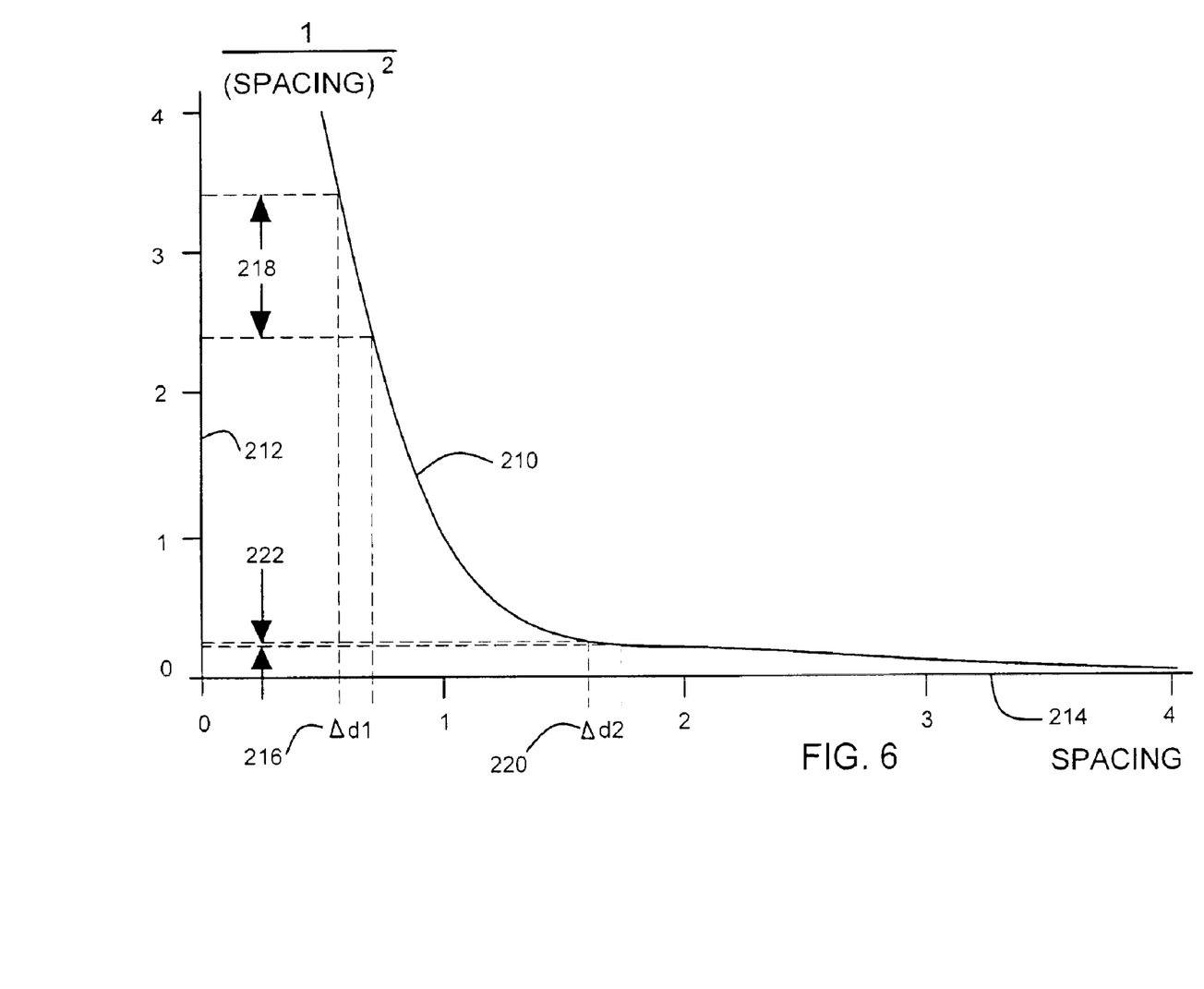
FIG. 6 illustrates an inverse square law relationship between electrostatic force and actuator spacing.

FIG. 6 illustrates an inverse square law relationship 210 between electrostatic force on vertical axis 212 and actuator spacing on horizontal axis 214. The vertical and horizontal scales in FIG. 6 are in arbitrary (unscaled) units to illustrate the inverse square law relationship 210. The illustration in FIG. 6 can be scaled with units for a particular application. The example illustrated in FIG. 6 is at a fixed control voltage.

It will be understood by those skilled in the art that the control voltage will vary during normal operation of the controller 180 in order to control fly height. When a control voltage VC is applied between the electrostatic actuator electrode 182 and the disc 184 in FIG. 5, an electrostatic force is generated that tends to attract the electrostatic actuator electrode 182 toward the disc 184. This force is approximated by Equation 1:

$$F = \varepsilon_R \varepsilon_0 \frac{AV^2}{2d^2} \qquad \text{Equation 1}$$

where:
F is an electrostatic force;
$\epsilon_R$ is a relative dielectric constant of the air bearing layer;
$\epsilon_0$ is the permittivity of free space;
A is a surface area of the electrostatic actuator electrode;
V is the control voltage; and
d is the spacing between the electrostatic actuator electrode and the disc.

The electrostatic actuator electrode 182 is spaced apart from the disc 184 by the actuator spacing d in the electrostatically charged portion of the air bearing layer. The control voltage VC generates the electrostatic actuator force F that varies the actuator spacing d over a selected control range.

As illustrated in FIG. 6, selected equal control range Δd1 or Δd2 along the spacing axis 214 will generate electrostatic forces along vertical axis 212 that vary unequally as a function of the spacing. If the spacing is narrower as illustrated at 216 (for Δd1), then there will be a comparatively greater variation in the electrostatic force over the control range as illustrated at 218. If the spacing is wider as illustrated at 220 (for Δd2), then there will be a comparatively smaller variation in the electrostatic force over the control range as illustrated at 222. When the magnitude of the electrostatic force varies greatly over the control range, then the task of designing a controller 180 that provides stable control becomes more difficult. With the arrangements described in FIGS. 3–4 and 7–11, an electrostatic actuator electrode, or electrodes, can be placed in many different locations rather than being constrained to a position near the read/write head. This allows for a good balance between clearance, sensitivity (stroke) and stability to be found in each particular design of a slider. A ratio of changes of the electrostatic actuator force F to ranges in the control voltage is stabilized by positioning the electrostatic actuator electrode in an electrode position that is forward from the trailing or back side. The electrostatic actuator electrode is placed forward by an amount that is adjusted for the particular application. Examples of various positions for electrostatic actuator electrodes are described below in connection with FIGS. 7–9.

Figure 7:
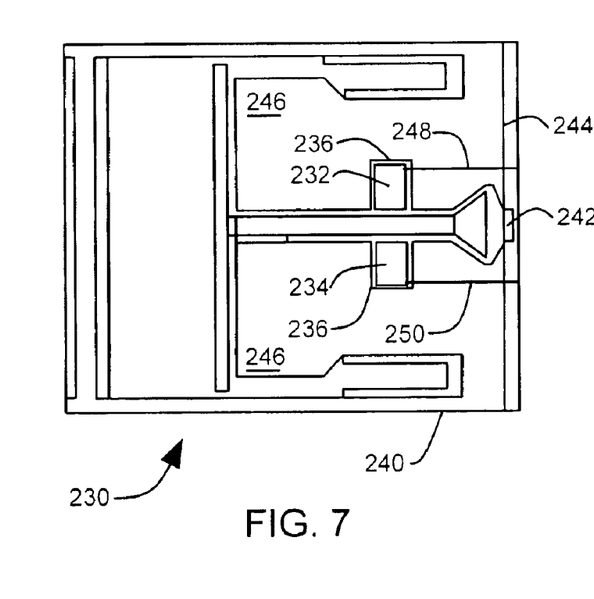
FIG. 7 illustrates a bottom view of a first embodiment of a slider.

FIG. 7 illustrates a bottom view of a first embodiment of a slider 230 which includes first and second electrostatic actuator electrodes 232, 234 deposited on top of an air bearing surface 236. The electrostatic actuator electrodes 232, 234 are electrically insulated from the slider substrate 240 and generally arranged as explained above in connection with FIGS. 3–4. The electrostatic actuator electrodes 232, 234 are dedicated electrodes and are electrically charged to control fly height without charging the slider substrate 240.

The slider 230 includes a read/write head (also called a transducer) 242 that is deposited on a trailing or back side 244 of the slider substrate 240. The air bearing surface 236 protrudes from a bottom side 246 of the slider substrate 240. First and second electrode leads 248, 250 connect the electrostatic actuator electrodes 232, 234 to bonding pads (not illustrated in FIG. 7) on the trailing side 244. The electrostatic actuator electrodes 232, 234 are placed ahead of the trailing side 244 in positions that are adjusted depending on the needs of the application. The electrodes 232, 234 are in positions where the air bearing surface 236 is far enough away from a disc (not illustrated) to provide clearance for the electrodes 232, 234.

Figure 8:
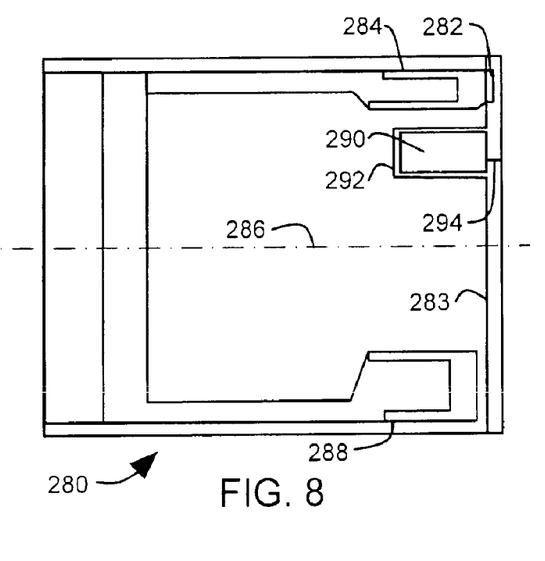
FIG. 8 illustrates a bottom view of a second embodiment of a slider.

FIG. 8 illustrates a bottom view of a second embodiment of a slider 280. A read/write head 282 is positioned on trailing or back side 283 at the end of a side rail 284. The slider 280 is not symmetrical about a roll axis 286. The side rail 284 has a different shape than a side rail 288, making the slider asymmetrical about the roll axis 286. The slider 280 does not fly level relative to a disc, but is rotated slightly about the roll axis 286. The slight rotation about the roll axis provides clearance for an electrostatic actuator electrode or pad 290. The electrostatic actuator electrode 290 is deposited on an insulation layer on an air bearing surface 292 and connects by an electrode lead 294 to a bonding pad (not illustrated) on the trailing side 283. The dedicated electrostatic actuator electrode 290 is positioned such that it is not the closest feature to the disc, and clearance is not compromised. The area or size of the electrostatic actuator electrode 290 is selected to provide adequate fly height stroke. In other respects, the slider 280 is generally arranged as described above in connection with FIGS. 3–4.

Figure 9:
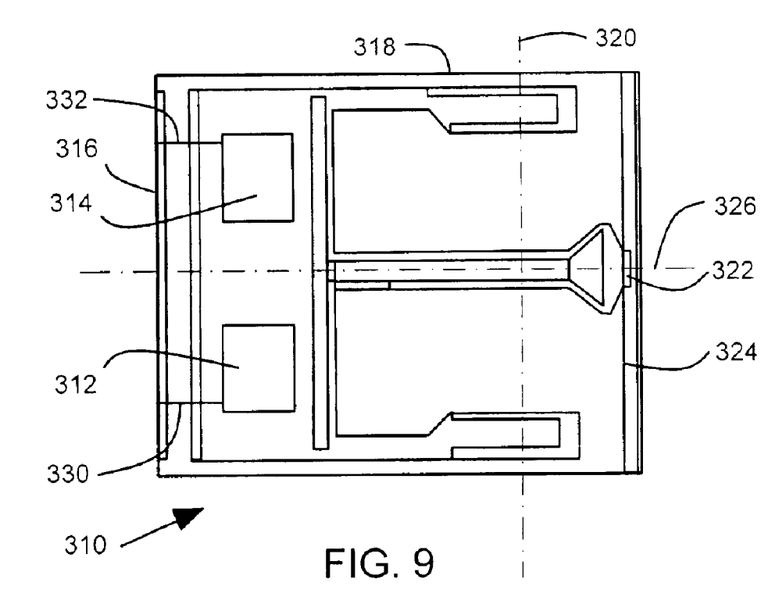
FIG. 9 illustrates a bottom view of a third embodiment of a slider.

FIG. 9 illustrates a bottom view of a third embodiment of a slider 310. First and second electrostatic actuator electrodes 312, 314 are positioned near a leading side 316 of a slider substrate 318. Electrostatic actuator electrodes 312, 314 can be individually charged to different control potentials in order to control or change both the roll angle about a roll axis 326 and the fly height of a pole tip of a read/write head 322 that is deposited on a trailing or back side 324 of the slider 318. A first electrode potential is applied to the first electrostatic actuator electrode 312 and a second electrode potential is applied to the second actuator electrode 314, and the second electrode potential is varied relative to the first electrode potential to control the roll angle.

Alternatively, electrostatic actuator electrodes can be positioned along a roll axis 326 and individually charged to different control potentials to change or control pitch angle of the slider 310 as well as the fly height. Electrode leads 330, 332 connect the electrostatic actuator electrodes 312, 314 to contact or bonding pads on the leading side 316. In other respects, the electrostatic actuator electrodes are arranged as described above in connection with FIGS. 3–4.

Figure 10:
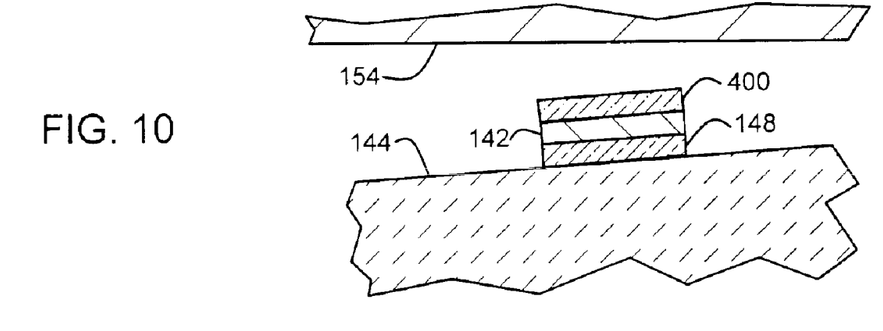
FIG. 10 illustrates a diamond like carbon layer on an electrostatic actuator electrode.

FIG. 10 illustrates a diamond-like carbon layer 400 on an electrostatic actuator electrode 142. The arrangement illustrated in FIG. 10 is similar to the arrangement illustrated in FIG. 4 and reference numerals used in FIG. 10 that are the same as reference numerals used in FIG. 4 identify the same or similar features. The layer 400 of diamond like carbon prevents a short circuit between the electrostatic actuator electrode 142 and the disc 154.

Figure 11:
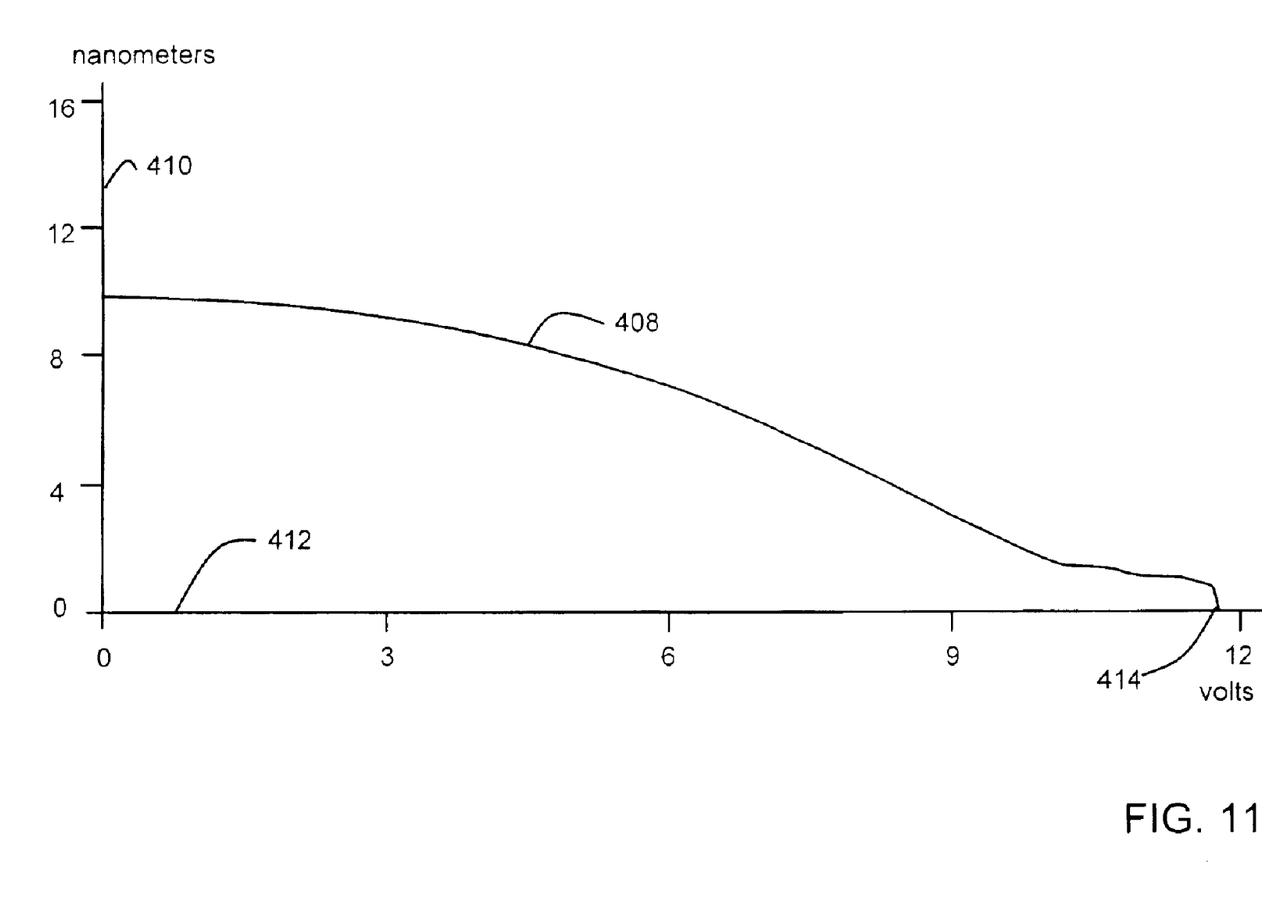
FIG. 11 illustrates pole tip fly height as a function of a control voltage applied between a disc and an electrostatic actuator electrode.

FIG. 11 illustrates pole tip fly height (PTFH) 408 as a function of a control voltage applied between a disc and an electrostatic actuator electrode on an exemplary slider in a disc drive. A vertical axis 410 represents the pole tip fly height in nanometers and a horizontal axis 412 represents the control voltage. The pole tip fly height 408 results from a balance of electrostatic force from the electrostatic actuator electrode, a lift force generated by the air bearing layer and a spring bias force applied at a gimbal point on the slider by a track accessing arm. The curve shown in FIG. 11 includes the effects of the electrostatic actuator stroke changing as the actuator spacing changes, as explained above in connection with FIG. 6. As can be seen in FIG. 11, the pole tip fly height is a monotonic function over a range of control voltages from 0 to 9 volts or more. The monotonic function is adaptable to stable control of fly height. The fly height decreases as the control voltage increases until the read/write head contacts the disc at 414.

The arrangements of electrostatic actuator electrodes described above in connection with examples illustrated in FIGS. 3–11 typically do not interfere with the many variations of known slider geometries and can be applied generally in a wide variation of disc drive designs.

In summary, a slider (such as 140) for accessing data stored on a disc (such as 154), includes a slider substrate (such as 146) having a trailing side (such as 152), a bottom side (such as 156) facing the disc, and an air bearing surface (such as 144) that protrudes from the bottom side. The slider includes a read/write head (such as 150) on the trailing side. The read/write head accesses the data stored on the disc. A first insulation layer (such as 148) is disposed on top of the air bearing surface. A first electrostatic actuator electrode (such as 142) is disposed on top of the first insulation layer and faces the disc across an electrostatically charged portion (such as 158) of an air bearing layer (such as 160). The first electrostatic actuator electrode protrudes above the air bearing surface into the electrostatically charged portion of the air bearing layer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the slider while maintaining substantially the same functionality without departing from the scope and spirit of the present invention. In addition, although the preferred embodiment described herein is directed to a magnetic drive, it will be appreciated by those skilled in the art that the teachings of the present invention can be applied to optical and magneto-optical drives, without departing from the scope of the present invention.

What is claimed is:

1. A slider for accessing data stored on a disc, comprising:
   a slider substrate having a trailing side, a bottom side facing the disc, and an air bearing surface that protrudes from the bottom side;
   a read/write head on the trailing side, the read/write head accessing the data;
   a first insulation layer disposed on top of the air bearing surface; and
   a first electrostatic actuator electrode disposed on top of the first insulation layer and facing the disc across an electrostatically charged portion of an air bearing layer; the first electrostatic actuator electrode protruding above the air bearing surface into the electrostatically charged portion of the air bearing layer.

2. The slider of claim 1 wherein a portion of the air bearing surface that underlies the first insulation layer is at substantially the same height as a portion of the air bearing surface that is directly alongside the first insulation layer.

3. The slider of claim 1 wherein the first electrostatic actuator electrode has an electrode potential, and the slider substrate has a slider substrate potential that is different than the electrode potential, and the first insulation layer electrically insulates the first electrostatic actuator electrode from the slider substrate.

4. The slider of claim 3 wherein the disc has a disc potential that differs from the electrode potential by a control voltage.

5. The slider of claim 4 wherein the first electrostatic actuator electrode is spaced apart from the disc by an actuator spacing in the electrostatically charged portion of the air bearing layer, and the control voltage generates an electrostatic actuator force that varies the actuator spacing over a control range.

6. The slider of claim 4 wherein a ratio of changes of the electrostatic actuator force to changes in the control voltage is stabilized by positioning the first electrostatic actuator electrode in an electrode position that is forward from the trailing side.

7. The slider of claim 4 wherein the slider substrate is electrically connected to the disc and the slider substrate potential is substantially equal to the disc potential.

8. The slider of claim 3, further comprising:
   a sidewall insulating layer on a sidewall of the slider substrate;
   a bonding pad disposed on the sidewall insulating layer; the bonding pad connecting to a source of the electrode potential; and
   an electrode lead connecting the bonding pad to the electrostatic actuator electrode.

9. The slider of claim 1 wherein the first electrostatic actuator electrode is positioned in an electrode position that is forward from the trailing edge by a length sufficient to prevent contact between the first electrostatic actuator electrode and the disc.

10. The slider of claim 1, further comprising:
    a second insulation layer disposed on top of a second air bearing surface;
    a second electrostatic actuator electrode disposed on top of the second insulation layer and facing the disc across a second electrostatically charged portion of the air bearing layer; the second electrostatic actuator electrode protruding above the second air bearing surface into the electrostatically charged portion of the air bearing layer.

11. The slider of claim 10 wherein a first electrode potential is applied to the first electrostatic actuator electrode and a second electrode potential is applied to the second actuator electrode, and the second electrode potential is varied relative to the first electrode potential.

12. The slider of claim 11 wherein the first and second electrode potentials control a pitch angle of the slider.

13. The slider of claim 11 wherein the first and second electrode potential control a roll angle of the slider.

14. The slider of claim 1, further comprising:
a layer of diamond like carbon disposed on the surface of the first electrostatic actuator electrode, preventing a short circuit between the first electrostatic actuator electrode and the disc.

15. A method for manufacturing a slider for accessing data stored on a disc, comprising:
providing a slider substrate having a trailing side, a bottom side facing the disc, and an air bearing surface that protrudes from the bottom side;
depositing a read/write head on the trailing side;
depositing an insulation layer on top of the air bearing surface; and
depositing a first electrostatic actuator electrode on top of the first insulation layer to protrude above the air bearing surface.

16. The method of claim 15, further comprising:
insulating an electrode potential on the first electrostatic actuator electrode from a slider substrate potential on the slider substrate with the first insulation layer.

17. The method of claim 16, further comprising:
providing a disc potential on the disc that differs from the electrode potential by a control voltage.

18. The method of claim 17, further comprising
generating an electrostatic actuator force that varies the actuator spacing over a control range by spacing the first electrostatic actuator electrode apart from the disc by an actuator spacing in the electrostatically charged portion of the air bearing layer.

19. The method of claim 15, further comprising:
depositing a sidewall insulating layer on a sidewall of the slider substrate;
depositing a bonding pad on the sidewall insulating layer;
connecting the bonding pad to a source of electrode potential; and
connecting an electrode lead between the bonding pad and the electrostatic actuator electrode.

20. The method of claim 15, further comprising:
positioning the first electrostatic actuator electrode in an electrode position that is forward from the trailing edge by a length sufficient to prevent contact between the first electrostatic actuator electrode and the disc.

21. A slider for accessing data stored on a disc, comprising:
a slider substrate having a trailing side, a bottom side facing the disc, and an air bearing surface that protrudes from the bottom side;
a read/write head on the trailing side, the read/write head accessing the data;
a first insulation layer disposed on top of the air bearing surface; and a first electrostatic actuator electrode disposed on top of the first insulation layer and facing the disc; and
means for protruding the first electrostatic actuator electrode above the air bearing surface into an electrostatically charged portion of the air bearing layer.

22. The slider of claim 21 wherein a portion of the air bearing surface that underlies the first insulation layer is at substantially the same height as a portion of the air bearing surface that is directly alongside the first insulation layer.

23. The slider of claim 21 wherein the first electrostatic actuator electrode has an electrode potential, and the slider substrate has a slider substrate potential that is different than the electrode potential, and the first insulation layer electrically insulates the first electrostatic actuator electrode from the slider substrate.

24. The slider of claim 23 wherein the disc has a disc potential that differs from the electrode potential by a control voltage.

25. The slider of claim 24 wherein the first electrostatic actuator electrode is spaced apart from the disc by an actuator spacing in the electrostatically charged portion of the air bearing layer, and the control voltage generates an electrostatic actuator force that varies the actuator spacing over a control range.

26. A device for accessing data stored on a medium, comprising:
a substrate having a back side, a bottom side facing the medium, and a surface that protrudes from the bottom side;
a transducer on the back side, the transducer accessing the data;
a first insulation layer disposed on top of the surface; and
a first electrostatic actuator electrode disposed on top of the first insulation layer and facing the medium across an electrostatically charged portion of an air layer; the first electrostatic actuator electrode protruding above the surface into the electrostatically charged portion of the air layer.

27. The device of claim 26 wherein a portion of the surface that underlies the first insulation layer is at substantially the same height as a portion of the surface that is directly alongside the first insulation layer.

28. The device of claim 26 wherein the first electrostatic actuator electrode has an electrode potential, and the substrate has a substrate potential that is different than the electrode potential, and the first insulation layer electrically insulates the first electrostatic actuator electrode from the substrate.

29. The device of claim 26, further comprising:
a sidewall insulating layer on a sidewall of the substrate;
a bonding pad disposed on the sidewall insulating layer; the bonding pad connecting to a source of the electrode potential; and
an electrode lead connecting the bonding pad to the electrostatic actuator electrode.

* * * * *